April 15, 1969   M. D. JENNINGS ET AL   3,438,200
POWER STEERING WITH DIRECTIONAL ADMITTANCE AND POPPETS
Filed March 31, 1967   Sheet 1 of 5
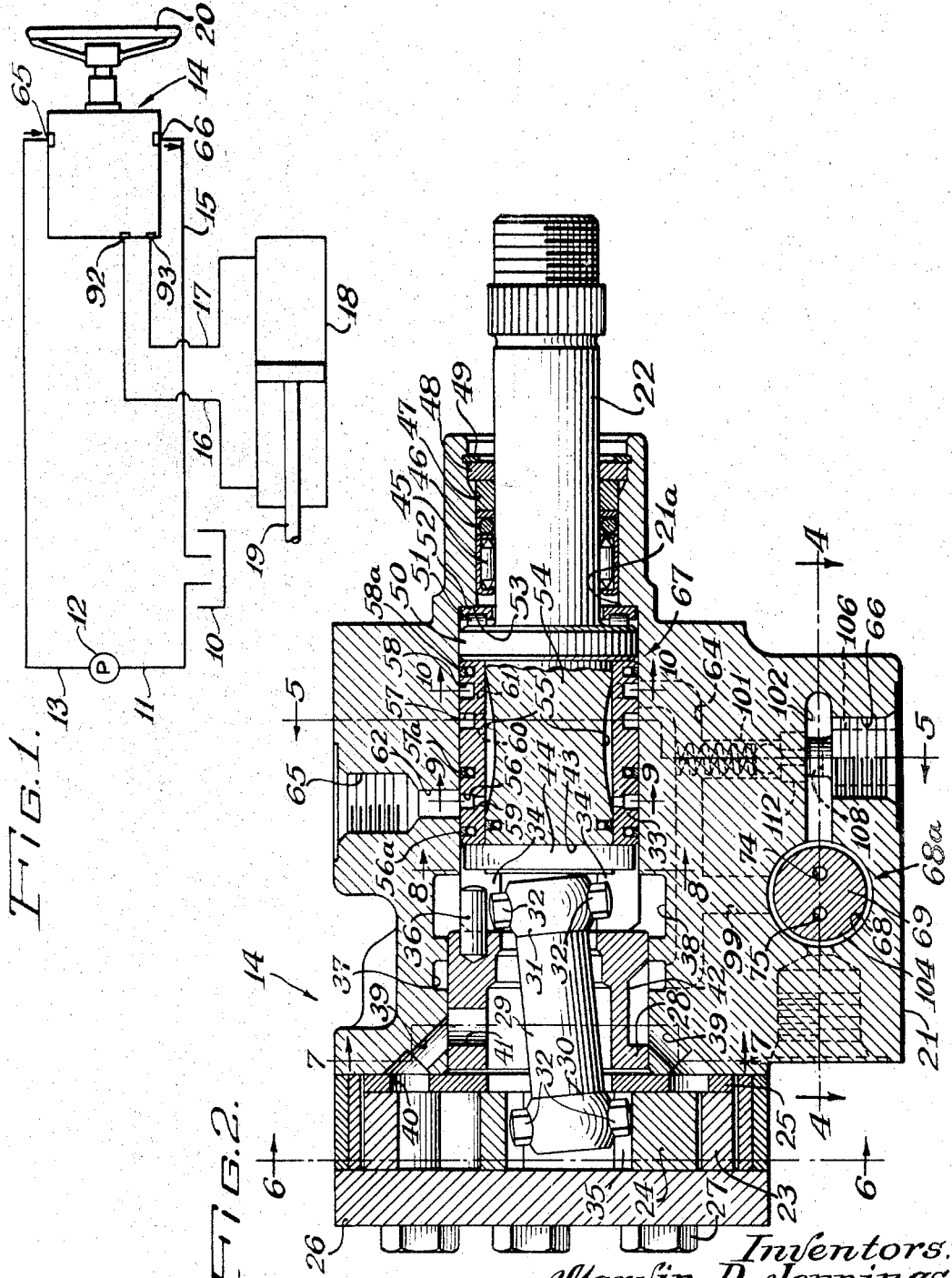
Inventors:
Marvin D. Jennings
Richard J. Lech
By Walter ... Gregory
Atty.

Inventors:
Marvin D. Jennings
Richard J. Lech
By Walter ...
Atty.

Inventors:
Marvin D. Jennings
Richard J. Lech
By Walter F. Gregory
Atty.

April 15, 1969   M. D. JENNINGS ET AL   3,438,200
POWER STEERING WITH DIRECTIONAL ADMITTANCE AND POPPETS
Filed March 31, 1967
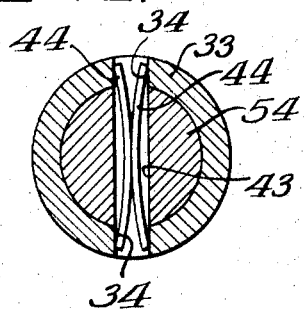
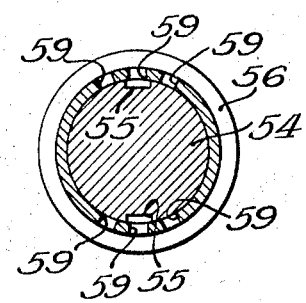
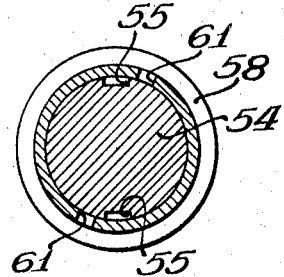
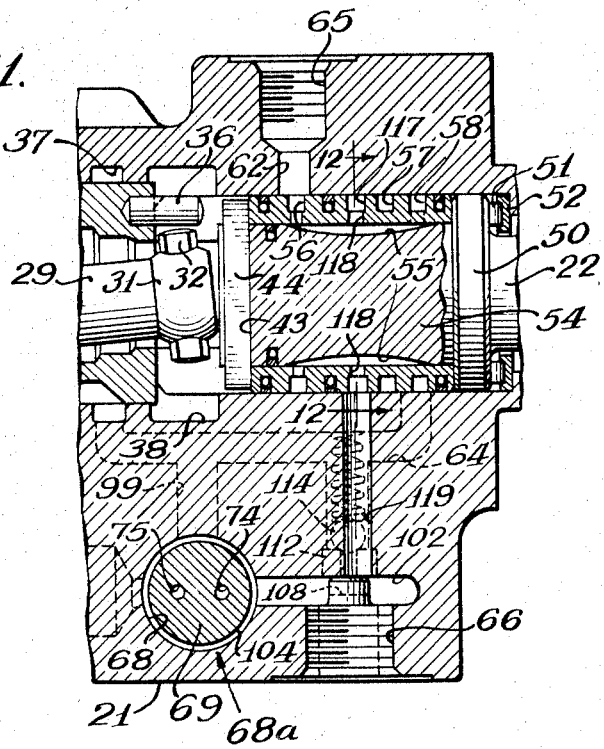
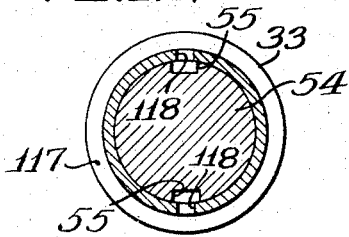
Inventors:
Marvin D. Jennings
Richard J. Lech
By
Atty.

Inventors:
Marvin D. Jennings
Richard J. Lech
By [signature]
Atty.

United States Patent Office 3,438,200
Patented Apr. 15, 1969

3,438,200
POWER STEERING WITH DIRECTIONAL
ADMITTANCE AND POPPETS
Marvin D. Jennings, Naperville, and Richard J. Lech, Hickory Hills, Ill., assignors to International Harvester Company, Chicago, Ill., a corporation of Delaware
Filed Mar. 31, 1967, Ser. No. 627,353
Int. Cl. F15b 15/18; B62d 5/06; F16h 41/00
U.S. Cl. 60—52          11 Claims

ABSTRACT OF THE DISCLOSURE

A vehicular hydrostatic power steering unit wherein the hand pump and fluid flow and direction of flow control components thereof are disposed in a close physical relationship one to another with the unit being adaptable for use with either an open-center or close-center hydraulic circuit.

Background of the invention

This invention relates to hydraulic power steering systems, but more particularly to the hydrostatic type system and the fluid control means employed therewith for control of fluid flow and of the direction of such fluid flow.

In hydrostatic power steering systems of the type generally shown in the Cassaday et al. U.S. Patent 2,974,491 it has been customary to employ a hand pump assembly and a fluid flow control valve incorporated in a unitary structure communicatively interconnected with a remotely disposed linear spool-type shuttle valve, frequently of the differential pressure actuated variety, that is operative for control of the direction of flow of fluid being directed under pressure to the fluid motor or power cylinder of the system. While such an arrangement was found to be generally satisfactory when employed in association with an open-center hydraulic circuit it was not altogether suitable for use in the closed-center type of hydraulic circuit because of the tendency of the shuttle valve assembly thereof to accumulate deposits of silt resulting in difficulties in the overall operation of the control of fluid flow therethrough. A further disadvantageous feature of such prior arrangement resides in the separation or remote disposition of the shuttle valve from the control valve resulting in a cumbersome layout occupying excess space in an area in a vehicle where space is usually at a premium. Furthermore in prior hydrostatic power steering systems there was a tendency to "drift," an action which permits turning of the steerable wheels of the vehicle without moving the operator's control wheel, hence the operator did not always retain the desired complete control of the steering operation. One prior attempt to provide an improved arrangement for overcoming some of these faults is shown in the copending U.S. patent application Ser. No. 547,969, now Patent No. 3,360,932.

Summary of the invention

The present invention is more specifically directed to a compact and complete assembly of an auxiliary fluid pressure source and fluid control means for a hydrostatic power steering system utilized in association with either an open-center or closed-center hydraulic circuit. In the invention as proposed complete fluid flow control and auxiliary fluid pressure means are provided which advantageously are readily convertable from a unit adapted for use with a closed-center hydraulic circuit to one adapted for use with an open-center circuit thus providing a unit compatible for use with both systems upon modification of a very limited number of components. In the proposed unit the fluid control valve moves before flow is started and thus provides a simplified means for minimizing silting and thereby overcomes the prior objection of excess silting. In addition it provides for an initial movement of a shuttle type of directional control valve mechanism thus establishing the direction of steering before power assist is provided and by so doing minimizes the wastage of fluid. Furthermore, the proposed unit provides a "no drift" system since the steerable wheels cannot be turned without moving the operator's steering wheel while additionally providing safe manual steering when needed. Since the proposed device provides a unit construction wherein a flow interrupting valve and a direction of flow control valve are incorporated in a housing containing a hand pump that provides auxiliary fluid pressure such construction makes for a more complete, compact and less costly unit occupying a minimum of space.

The principle object therefore is to provide a compact fluid control unit having therein in closely disposed physical relationship a manually operable gear within a gear hydraulic pump, a rotary fluid flow control valve, and a direction of fluid flow control valve.

Another object is to provide a simplified means for converting a hydrostatic power steering control unit from one adaptable for use with a closed-center hydraulic circuit to one adaptable for use with an open-center hydraulic circuit.

A still further object is to provide in a hydrostatic power steering control unit a direction of fluid flow control valve mechanism having a linear spool shuttle element and spring biased poppet valve elements therein and wherein the latter elements are operative to restrict "drift" in an associated vehicle steering hydraulic circuit.

A further object is to provide a housing assembly having a conventional hydrostatic power steering system gear within a gear type hand pump operative responsive to rotation of an operator's steering wheel coupled therewith, a rotary valve mechanism selectively operative upon rotation of said steering wheel for admitting and interrupting the flow of fluid from a pressure source, and a linear-spool shuttle valve mechanism for controlling direction of fluid flow from the rotary valve to an associated fluid motor.

The foregoing and other objects and features of the invention will become apparent as the disclosure is more fully made in the following detailed description of a preferred embodiment of the invention as illustrated in the accompanying sheets of drawings.

Description of the drawings

FIGURE 1 is a schematic representation of a hydrostatic power steering system incorporating the proposed invention;

FIGURE 2 is a longitudinal vertical sectional view of a hydrostatic power steering hand pump assembly incorporating the proposed invention;

FIGURE 8 is a somewhat fragmentary vertical sectional view taken along the line 8—8 of FIGURE 2;

FIGURE 9 is a somewhat fragmentary vertical sectional view taken along the line 9—9 of FIGURE 2;

FIGURE 10 is a somewhat fragmentary vertical sectional view taken along the line 10—10 of FIGURE 2;

FIGURE 11 is a longitudinal vertical sectional view generally similar to FIGURE 2 but somewhat more fragmentary and showing a modified form of the sleeve valve element and exhaust passage adaptable for an open-center hydraulic circuit;

FIGURE 12 is a somewhat fragmentary vertical sectional view taken along the line 12—12 of FIGURE 11;

*Description of the preferred embodiment*

Figure 3:
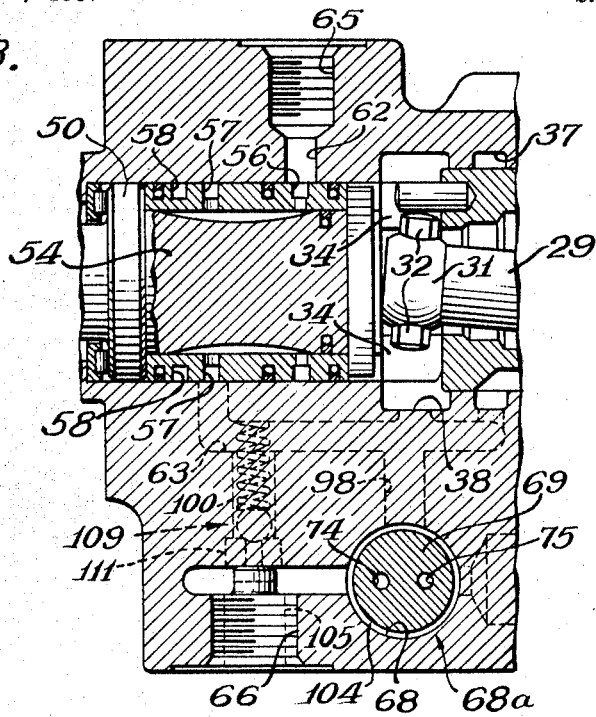
FIGURE 3 is a view similar to FIGURE 2 but somewhat fragmentary and taken from the opposite side.

Referring now to the drawings it will be seen that FIGURE 1 depicts generally schematically the components of a hydrostatic power steering system comprising a reservoir source of fluid 10 connected by a conduit 11 with the inlet of a hydraulic supply pump 12 the outlet or discharge side of which connects by a conduit 13 with a power steering unit or fluid control assembly, indicated in its entirely by the reference numeral 14. An outlet or return from said fluid control assembly is connected by a conduit 15 with reservoir 10, while conduits 16, 17 interconnect said assembly with opposite ends of a conventional fluid motor or power cylinder 18. It will be understood the piston rod 19 of said cylinder may be connected by well-known operating means with the vehicle wheels to be steered, while the assembly 14 will be provided with suitable operating control means such as the operator's hand-operated steering wheel indicated at 20.

The power steering assembly 14 selected for purposes of illustrating a preferred application of the present invention incorporates therein a gear within a gear type auxiliary fluid pressure generating hand pump generally similar, except for the modifications proposed herein, to the unit manufactured by the Ross Gear and Tool Company, Inc., of Lafayette, Ind., and marketed under the trade designation of Hydrostatic Hand Pump HDS-P2, 11–62, and described in detail in the U.S. Dettlof et al. Patent 3,087,436.

In said assembly a housing 21 having a bore 21a therein receives a drive shaft 22 which projects from one end of the housing and has secured to the outwardly projecting end thereof an operator's control wheel 20. The opposite end of said housing mounts the pump elements which include an interiorly toothed outer annular element 23 and an exteriorly toothed inner element 24, plus a wear plate 25 disposed between element 23 and an adjacent wall or face of housing 21 that is clamped along with said outer element between the housing and a cover plate 26 by suitable fastening means such as the bolts 27.

A valve sleeve 28 in the bore of said housing accommodates a shaft 29 therethrough, for transmitting drive from drive shaft 22 to the inner pump element 24, with the ends of shaft 29 formed as frusto-spherical heads 30, 31 and having a pair of diametrically opposite studs 32, 32 projecting radially therefrom. An outer sleeve member 33, interconnected with drive shaft 22 as hereinafter explained, is fashioned with an axial recess which receives the head 31 of shaft 29 and with a pair of diametrically extending slots 34, 34 that slidably receive the studs 32, 32 of head 31. Inner pump element 24 has a central bore for receiving head 30, and axially extending grooves 35, 35 for slidably receiving the studs 32, 32 of the latter head.

The meshing teeth of the inner and outer pump elements are formed, as is well known, so that as inner element 24 rotates on its axis it orbits within the outer element while said teeth cooperate effectively to divide the space between these elements into suction and pressure chambers, each of which alternately expands and contracts as the inner element 24 orbits. A drive pin 36 mounted in sleeve valve 28 and projecting therefrom extends into one end of one of the slots 34 in sleeve member 33 and serves for rotating sleeve valve 28 at the same speed as drive shaft 22.

Annular grooves 37, 38 opening into the bore of housing 20 communicate respectively with opposite openings of the hand pump assembly as will be subsequently explained. Since annular groove 38 is disposed in the plane of slot 34 it is in continuous communication through said slot with the interior of valve sleeve 28, while annular groove 37 is located within the axial limits of sleeve 28. A circumferential series of ports 39 in housing 21 open into the bore thereof and communicate respectively, through openings 40 in wear plate 25 with the spaces between the teeth of outer pump element 23. A series of radial passages 41 in valve sleeve 28, corresponding in number to the teeth of the inner pump element 24, cooperate with ports 39. Intermediate adjacent ones of the radial passages 41 the exterior surface of valve sleeve 28 is provided with axially extending grooves 42 which overlap annular groove 37 and cooperate with ports 39 in housing 21.

Figure 6:
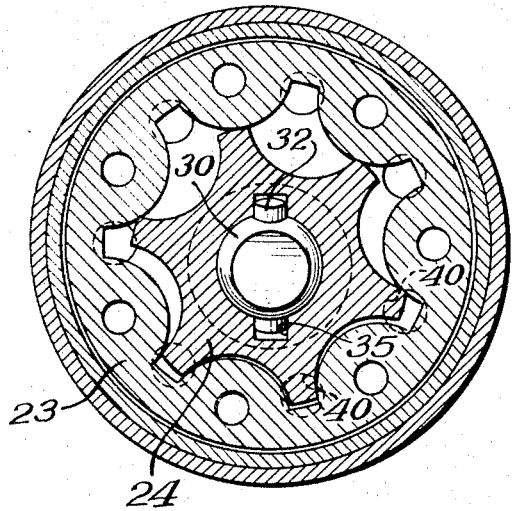
FIGURE 6 is a vertical sectional view taken along the line 6—6 of FIGURE 2.
Figure 7:
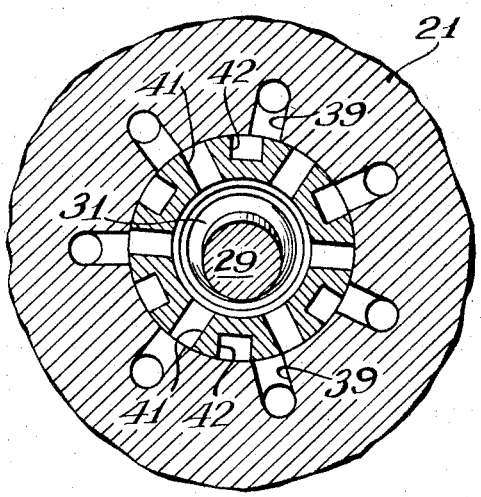
FIGURE 7 is a vertical sectional view taken along the line 7—7 of FIGURE 2.
Figure 15:
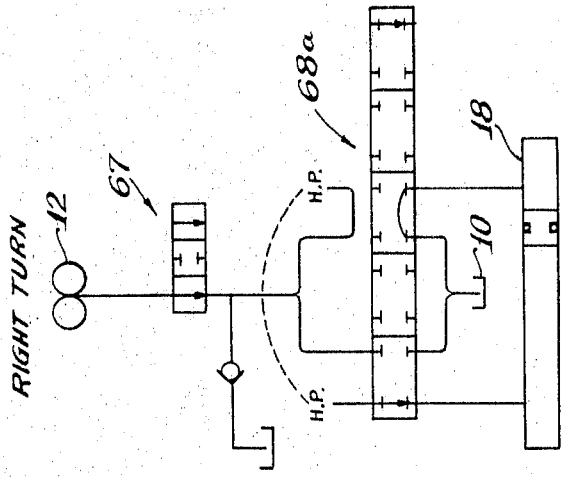
FIGURES 13, 14 and 15 are circuit flow diagrams representing fluid flow conditions in the circuit in the respective left turn, neutral and right turn positions of the elements of the power steering unit.
Figure 14:
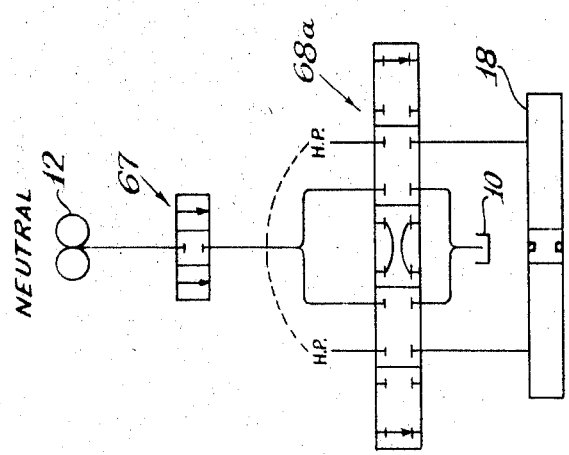
Figure 13:
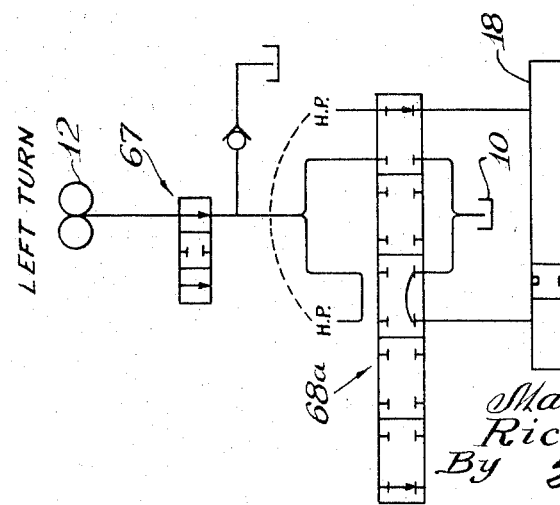

The manner in which the radial passages 41 and the axially extending grooves 42 cooperate with ports 39 to established fluid communication between the pump chambers and annular grooves 37 and 38 will be apparent from FIGS. 6 and 7 wherein the inner pump element 24 and valve sleeve 28 are shown in their simultaneously occupied positions. Passages 41, 42 are so oriented with respect to the teeth of inner pump element 24 that as each of such teeth reaches the point of deepest mesh with a space between the teeth of outer element 23 the valving port 39 will be occluded by one of the lands of valve sleeve 28.

It will be readily apparent from the above that the valve passages 41 and grooves 42 will cooperate communicatively with the ports 39 to connect each expanding pump chamber with one of the annular grooves 37, 38 and each contracting pump chamber to the other of such annular grooves. As shown, counterclockwise rotation of drive shaft 22 will produce clockwise orbiting of the inner pump element, connecting of contracting pump chambers to annular groove 38 through radial passages 41, and connection of expanding chambers to annular groove 37 through valve grooves 42.

The slots 34, 34 extend axially inwardly in sleeve valve member 33 and are disposable in registering alignment with a diametral slot 43 (FIG. 8) in one end of shaft member 22, and a pair of leaf springs 44, 44 disposed in slots 43 and 34, 34 serve to coordinate the simultaneous movements of sleeve 33 and shaft 22 and provide resiliently yieldable means interconnecting said sleeve and shaft as more particularly described in the Moyer et al. U.S. Patent No. 3,059,717. Shaft 22 may be journaled by an antifriction bearing such as 45 disposed in bore 21a, of housing 21, while an adjoining fluid seal ring 46 backed up with a washer 47 and spacer 48 are maintained in position by a snap ring 49 mounted in an annular groove in said housing bore proximate the end thereof. An enlarged guide ring 50 on shaft 22 and constrained for rotation therewith is disposed for abutment against an end face of the outer sleeve 33, and abutting the opposite face of said guide ring is an antifriction thrust bearing 51 which additionally abuts a back-up washer 52 that in turn closely abuts a shoulder face 53 formed at the end of an enlarged diameter portion of the housing bore and which enlarged portion is adapted to receive therein outer sleeve member 33. As thus arranged axial forces imposed on said sleeve valve member are readily accommodated by thrust bearing 51 and shoulder abutment 53.

Rotatably disposed within the outer valve member 33 is a diametrically enlarged portion of shaft 22 constituting an inner valve member 54 which may be fashioned with a pair of diametrically spaced, axially extending grooves 55 for a purpose to be subsequently discussed.

Figure 5:
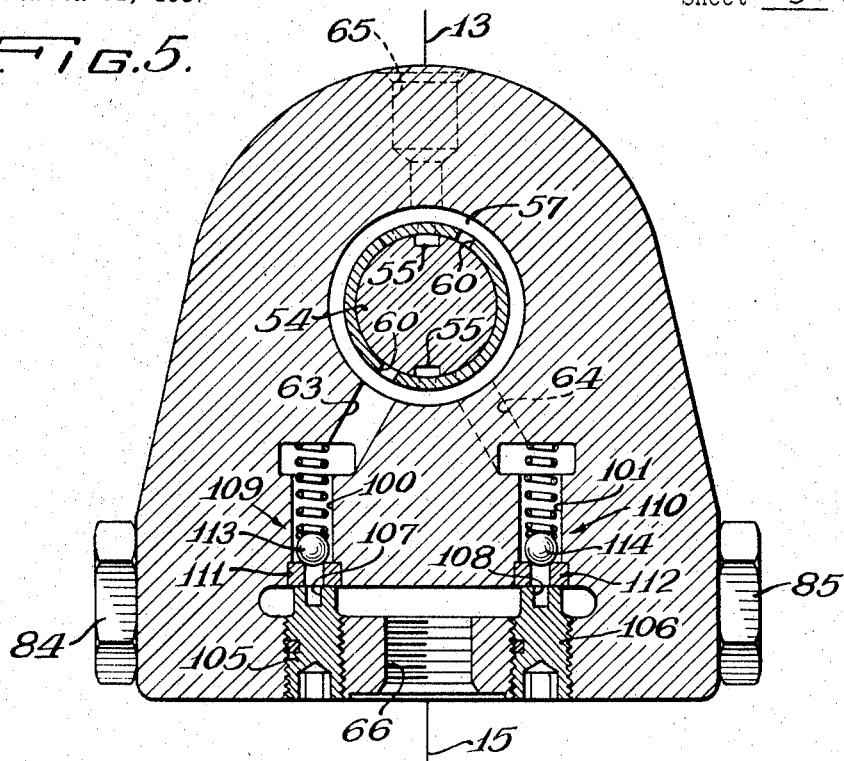
FIGURE 5 is a vertical sectional view taken along the line 5—5 of FIGURE 2.

The exterior surface of outer sleeve 33 is fashioned with a plurality of axially spaced apart annular grooves 56, 57, 58 with a plurality of circumferentially spaced, radial passages 59, 60, 61 extending from the respective annular grooves to the interior of said outer sleeve member (FIGS. 5, 9, 10). Said radial passages are so spaced axially as to be in selectively registerable alignment with the axial passages 55, 55 in inner member 54 upon relative rotation of said outer and inner members. However communication between grooves 56 and 55 is also established in neutral position by way of an additional pair of passages 59. Fluid seals such as indicated at 56a, 57a and 58a may be provided as is well known to limit leakage of fluid axially along sleeve member 33. The springs 44, 44 are selected and arranged to permit a movement of approximately 10° from either side of a neutral position and it will be appreciated that the movement permitted by the springs is coordinated with the spacing and dimensions of axial passages 55, 55 in inner valve member 54 and with the radial passages 59, 60 and 61 in outer valve member 33 for purposes that will be apparent as the description proceeds.

Annular grooves 56, 57, 58 communicate with the respective vertical passage 62 and the horizontal passages 63, 64 which in turn communicate with respective port openings 65 and 66 and thereafter conduits 13 and 15.

For purposes of simplifying description the outer and inner valve elements 33, 54 together with the resilient members 44, 44 may be said to comprise a rotary admittance valve designated in its entirety by the reference numeral 67.

Figure 4:
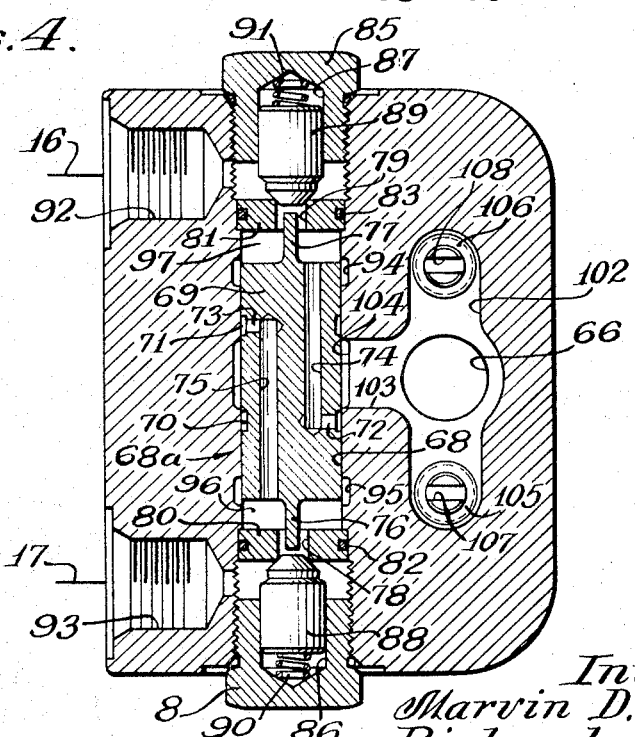
FIGURE 4 is a horizontal sectional view taken along the line 4—4 of FIGURE 2.

Now in accordance with the more specific teachings of the present invention there is provided a bore 68 extending transversely of housing 21 and beneath the rotary valve assembly 67, and slidably disposed therein is a shuttle valve assembly designated 68a. Said latter assembly includes a shuttle element 69 fashioned with a pair of axially spaced annular grooves 70, 71 on the surface thereof, and extending radially inwardly from said respective grooves are openings 72, 73 that open at their inner ends into respective axially extending passages 74, 75 (FIG. 4). The latter passages are so disposed that the open ends thereof open into opposite end faces of shuttle element 69. Extending axially outwardly from opposite ends of shuttle 69 are pin-like elements or projectors 76, 77 which are adapted to project into apertures such as 78, 79 in respective wall members 80, 81 positioned at opposite ends of bore 68. Sealing rings 82, 83 in annular grooves in said wall members may be provided for fluid sealing purposes as is well understood. Closure members such as the plugs 84, 85 (FIG. 4) threadably mounted in opposite ends of bore 68, are provided with central recesses 86, 87 that slidably accommodate poppets 88, 89 biased into seating positions in the respective apertures 78, 79, in wall members 80, 81, by the springs 90, 91. Port openings 92, 93 opening into opposite ends of the shuttle valve assembly communicate with the conduits 16, 17 that in turn open into opposite ends of cylinder 18.

Annular grooves 94, 95 in bore 68 are so spaced axially that they overlap opposite end portions of shuttle element 69 and the chambers or areas 96, 97 disposed between said element and the respective proximate wall member 80, 81, when said shuttle element is axially centered intermediate opposite ends of bore 68. Chambers 96, 97 communicate by way of respective vertical passages 98, 99 (FIGS. 2 and 3) with the horizontal passages 63, 64 (FIGS. 2 and 3). One end of passage 63 opens into annular groove 38 and the corresponding end of passage 64 opens into annular groove 37, while opposite ends of passages 63, 64, as heretofore noted, open respectively into annular grooves 57, 58. Proximate one end thereof horizontal passages 63, 64 open into respective vertical passages 100, 101 while opposite end portions of the latter passages communicate with a horizontal passage 102 having a horizontally extending portion 103 thereof that opens into an annular groove 104 formed in bore 68 medially of the ends thereof (FIG. 4).

The open ends of passages 100, 101 are covered by closure plugs 105, 106 threadably mounted therein (FIG. 5) and the inwardly extending ends of said plugs are fashioned with transverse slots or recesses 107, 108 to permit fluid communication of the upper portions of passages 100, 101 with passage 102 and port opening 66. Check valves, indicated generally by reference numerals 109, 110, positioned in the respective passages 100, 101 include seat members 111, 112, ball members 113, 114, and the springs 115, 116 stressed to normally bias said check valves to a closed position. With said check valves closed fluid communication between passages 100, 101, and 102 will of course be interrupted.

The rotary valve assembly heretofore described is adapted for application with a closed-center hydraulic circuit. Now in order to readily convert such an arrangement to one suitable for use in an open-center hydraulic circuit it is only necessary to fashion an additional annular groove such as 117 on an outer sleeve member 33 (FIG. 11), and to provide a pair of radial passages 118, 118 communicating said annular groove with the axial grooves 55, 55, of the inner valve member 54, and to provide a passage 119 communicatively connecting annular groove 117 with port opening 66.

*Operation*

With the system in neutral, such for instance as when the wheels of the vehicle are in a straight-ahead position, supply pump 12 communicates by way of conduit 13 with port opening 65 of the unit and thereafter through passage 62, annular groove 56 and radial passages 59, 59 into axial grooves 55, 55. However since radial passages 60 and 61 are out of register with axial grooves 55, 55 fluid flow (in a closed-center circuit) is interrupted while fluid in opposite ends of cylinder 18 is locked in position because poppets 88, 89, in the shuttle valve 68a, remain seated thus closing off any movement of fluid from said cylinder through the port openings 72, 73.

Assume now the operator's control wheel 20 is turned or rotated clockwise in order to turn the steerable wheels of the vehicle to the right. As hand wheel 20 is turned it carries with it shaft 22 and inner valve member 54 whereupon the springs 44, 44, in slot 43 in the opposite end of said inner valve member, are subsequently operative to impart a turning force by way of slots 34, 34 to the outer sleeve member 33, and by way of pin 36 and studs 32, 32 to the elements of the hand pump component of assembly 14 which thereupon generates pressure that operates to index the shuttle 68a as hereinafter explained. As the inner valve member 54 is further rotated the springs 44, 44 are compressed and the axial grooves 55, 55 therein are brought into registration with radial passages 60, 60 and the associated annular groove 57 in outer valve member 33 thereby establishing a fluid flow connection from inlet port opening 65 by way of passage 62, annular groove 56, radial passages 59, 59, axial grooves 55, 55, radial passages 60, 60, annular groove 57, and passage 63 to annunlar groove 38 associated with one of the openings of the hand pump unit. Passage 63 also opens into passage 100, the latter of which is normally closed off by check valve 109, and additionally into passage 98 which in turn opens into the annular groove 95 and chamber 96 at one end of the shuttle valve assembly 68a. Since the pressure in chamber 96 at this time is insufficient to open the associated poppet 88 the latter remains closed, but concomitant therewith the discharge from the hand pump unit exiting by way of annular groove 37 discharges into passage 64 and, by way of passage 99, into the annular groove 94 of shuttle assembly 68a and then into chamber 97 where it becomes effective to open poppet 89. When the latter poppet is opened, communication is established through port opening 92 by way of conduit 16 into one end of cylinder 18 to cause movement of the piston and rod 19 thereof which movement is thereupon translated by way of suitable mechanism (not shown) to the steerable wheels of the vehicle. When the fluid under pressure enters chamber 97 it is also effective to actuate shuttle element 69 moving it downwardly (as viewed in FIGURE 4) to cause the pin 76 in the opposite end of the shuttle to engage and unseat poppet 88. Hence as the piston moves fluid is discharged from one end of cylinder 18 by way of conduit 17, port opening 93, aperture 78, chamber 96, axial passage 75, radial passage 73, and annular grooves 71 and 104 into the extending portion 103 of passage 102. From passage 102 the fluid is directed by way of port opening 66 and conduit 15 back to reservoir 10.

In a left turn operation the radial passage 61 is brought into registration with axial grooves 55, 55 thus causing fluid from supply pump 12 to be directed by way of annular groove 58 into passage 64 and thence by way of annular groove 37 into one of the openings of the hand pump unit. The discharge from the hand pump in this instance is through annular groove 38 into passage 63 and thereafter through passage 98 into one end of shuttle valve 68a where it becomes effective to unseat poppet 88 and to move the shuttle element in the opposite direction from that heretofore disclosed for the right turn. Thereafter fluid is directed through port opening 93 and conduit 17 to an opposite end of cylinder 18 to cause movement fo the piston thereof in a direction to effect a left turn of the steerable wheels of the vehicle. At the same time fluid is discharged from the opposite side of cylinder 18 by way of conduit 16, port opening 92, past unseated poppet 89, and through aperture 79 and chamber 97 into axial passage 74, radial passage 72, annular grooves 70 and 104 into passage 102 and thence to reservoir 10.

It will be seen from the above that drift is restricted by virtue of the fact that normally the poppets 88, 89 of shuttle valve 68a are seated and hence fluid flow therepast from either end of the cylinder 18 into reservoir 10 is interrupted accordingly. Under this condition movement of the steerable wheels without movement of the operator's hand control wheel is curtailed.

In the event of failure of the external fluid pressure source 12 the steerable wheels may be operated by auxiliary fluid pressure generated by the hand pump unit as is well understood. In this instance fluid from reservoir 10 is pulled in through one of the check valves 109, 110 with the inactive one of said valves remaining closed. It will be readily apparent under this circumstance that when the operator's control wheel 20 is turned in one direction one of said check valves will be opened to admit fluid from the reservoir while the turning of said wheel in an opposite direction will effect an opening of the other one of said check valves.

When the modified valve element, illustrated in FIGURES 11 and 12, is utilized it will be seen that with the admittance valve 67 positioned for neutral operation fluid flow from port opening 65 is directed through annular groove 56, and passages 59, 59 into axial grooves 55, 55 which are in fluid flow communication by way of passages 118, 118 and annular groove 117 with the outlet passage 119 that opens into outlet port opening 66 thereby permitting free flow from port opening 65 through the valve 67 to port opening 66 when the valve 67 is in neutral thus providing open-center type operation for the associated hydraulic circuit.

It should now be apparent that a novel hydrostatic power steering unit has been shown and described, and it is to be understood that changes may be made in the construction without departing from the spirit of the invention or the scope thereof as defined in the appended claims.

What is claimed is:

1. In a vehicle hydrostatic power steering system having a fluid power motor adapted for turning steerable wheels of the vehicle, a reservoir source of fluid, and a primary source of fluid pressure; a combination therewith of a fluid control unit comprising: an operator's control wheel; a control pump operative responsive to movement of said control wheel for providing a fluid output to the system; fluid flow control valve means for selectively admitting and interrupting fluid flow from said primary source in response to movement of said pump; direction of fluid flow control valve means for normally sealing said motor from communication with the remainder of said system, but operative responsive to fluid flow from said fluid flow control valve means to selectively direct pressure from said primary source to either end of said motor while simultaneously releasing fluid from the other end of said motor to said reservoir; whereby drift free steering of the vehicle is achieved.

2. The structure according to claim 1 further characterized in that said direction of fluid flow control valve means includes a shuttle element reciprocally mounted in a bore in said housing structure and a pair of poppet valves interposed one each in fluid passages communicatively connecting the fluid pressure source thereof and a respective end of said fluid power motor, and having said poppet valves spring biased to a normally closed position but operative to admit and release fluid selectively to and from opposite ends of said fluid power motor.

3. The invention according to claim 2 but further characterized in that one of said poppet valves is operative responsive to fluid pressure from the source thereof to admit fluid to one end of said fluid power motor while simultaneously fluid pressure from the source thereof is additionally operative to reciprocate said shuttle element into engagement with the other one of said poppet valves to unseat the latter and permit release of fluid from a proximate end of said fluid power motor.

4. The invention according to claim 3 but further characterized in that said fluid flow control means includes rotatable inner and outer valve members telescopingly disposed one within the other and operatively coupled to said gear within a gear pump whereby upon rotation of said members in one direction by an associated operator's control wheel said pump is operative to provide a fluid pressure source for reciprocating said shuttle element in one direction and concomitant therewith unseating said poppets, and upon rotation of said members in an opposite direction said pump is operative to provide a fluid pressure source for reciprocating said shuttle element in an opposite direction and noncomitant therewith unseating said poppets.

5. The invention according to claim 1 but further characterized in that said fluid flow control means comprises rotatable and telescopingly disposed inner and outer valve members having resiliently yieldable means interconnecting said members and providing limited relative rotative movement therebetween and fashioned with fluid passages in said members including an inlet and a plurality of outlets and having certain of said passages registerable with others thereof to provide fluid passages therethrough so that in a first position of one of said members relative to the other thereof fluid flow therethrough is interrupted, and in a second position of one member rotated relative to the other thereof fluid communication is established between the inlet and a first outlet, and in a third position of one member rotated relative to the other fluid communication is established between the inlet and a second outlet.

6. The invention according to claim 1 but further characterized in that said fluid flow control means comprises rotatable and telescopingly disposed inner and outer valve members having resiliently yieldable means interconnecting said members and providing limited relative rotative movement therebetween and fashioned with fluid passages in said members including an inlet and a plurality of outlets and having certain of said passages registerable with others thereof to provide fluid passages therethrough so that in a first position of one of said members relative to the other thereof fluid communication is established between the inlet and a first outlet, and in a second position of one member rotated relative to the other thereof fluid communication is established between the inlet and a second outlet, and in a third position of one member rotated relative to the other thereof fluid communication is established between the inlet and a third outlet.

7. The invention according to claim 6 and further characterized in that fluid passage means provided in said housing structure opens at one end of said means into said first outlet and an opposite end thereof is adapted for fluid communication with said reservoir source of fluid.

8. The invention according to claim 3 but further characterized in that said shuttle element is fastened as a linear-spool having axial extending passages therein with one end of one of said passages opening into one end of said spool and one end of another of said passages opening into an opposite end of said spool, the opposite ends of said passages opening by way of respective radially extending passages and associated annular grooves fashioned in the exterior surface of said spool the latter of which are registerable alternatively, upon reciprocal movement of said spool in opposite directions, with fluid passage means formed in said housing structure communicating with said reservoir source of fluid.

9. The invention according to claim 8 but further characterized in that said direction of fluid flow control valve means includes closure means mounted in opposite ends of said housing structure bore with said poppet valves slidably mounted in said means, and a pair of wall members axially spaced apart and mounted in said bore and having a central aperture in each of said wall members providing a valve seat for a respective poppet, and a pair of axially spaced-apart annular grooves opening into said bore and communicatively connected to said fluid flow control valve means, and said shuttle element is so dimensioned longitudinally that when said element is centered medially between opposite ends of said bore a chamber is provided between each end of said element and a respective wall member, and said annular grooves are so disposed that when said shuttle element is centered between opposite ends of the bore a portion of each of said annular grooves overlaps in a fluid communicating relationship a respective one of said chambers.

10. The invention according to claim 9 but further characterized in that said shuttle element includes pin-like portions projecting axially outwardly one each from an opposite end of said element and extending into the apertures in the proximate wall members and engageable upon reciprocable movement of said element with a proximate one of said poppet valves to effect an unseating of the engaged one of said poppet valves.

11. The invention according to claim 5 but further characterized in that in the second position of one member rotated relative to the other thereof the inner member is rotated clockwise relative to said outer member, and in the said third position the inner member is rotated counterclockwise relative to the said outer member.

References Cited
UNITED STATES PATENTS

| | | |
|---|---|---|
| 3,059,717 | 10/1962 | Moyer et al. |
| 3,348,493 | 10/1967 | Easton _____ 103—130 |
| 3,358,711 | 12/1967 | Pruvot. |

EDGAR W. GEOGHEGAN, *Primary Examiner.*

U.S. Cl. X.R.

103—130